United States Patent
Acker et al.

(10) Patent No.: US 9,286,270 B2
(45) Date of Patent: Mar. 15, 2016

(54) SIMULTANEOUSLY DISPLAYING MULTIPLE RELATED DOCUMENTS IN A LOGICALLY HIERARCHICAL MANNER

(75) Inventors: Michael Acker, Grossfischlingen (DE); Rainer Andreas Dattke, Bruchsal (DE); Thomas Rohmann, Wiesloch (DE); Andrew Golledge, Stuttgart (DE); Roland Kraemer, Wiesloch (DE); Michael Schneider, Angelbachtal (DE); Franz-Josef Stortz, Edenkoben (DE)

(73) Assignee: SAP SE, Walldorf (DE)

( * ) Notice: Subject to any disclaimer, the term of this patent is extended or adjusted under 35 U.S.C. 154(b) by 726 days.

(21) Appl. No.: 12/338,057

(22) Filed: Dec. 18, 2008

(65) Prior Publication Data

US 2010/0162104 A1    Jun. 24, 2010

(51) Int. Cl.
*G06F 17/30* (2006.01)
*G06F 17/22* (2006.01)
*G06F 9/44* (2006.01)
*G06F 17/24* (2006.01)

(52) U.S. Cl.
CPC .............. *G06F 17/2229* (2013.01); *G06F 8/33* (2013.01); *G06F 17/24* (2013.01); *G06F 17/30* (2013.01)

(58) Field of Classification Search
CPC ....................................................... G06F 17/30
USPC ......................................................... 715/273
See application file for complete search history.

(56) References Cited

U.S. PATENT DOCUMENTS

| | | | |
|---|---|---|---|
| 5,806,078 A * | 9/1998 | Hug et al. ............... | 715/205 |
| 6,560,620 B1 * | 5/2003 | Ching ........................ | 715/229 |
| 6,918,082 B1 * | 7/2005 | Gross et al. ............... | 715/206 |
| 7,895,512 B2 * | 2/2011 | Roberts ..................... | 715/229 |
| 2004/0205539 A1 * | 10/2004 | Mak et al. ................. | 715/511 |
| 2006/0064634 A1 * | 3/2006 | Dettinger et al. ......... | 715/511 |
| 2007/0074127 A1 | 3/2007 | Acker et al. | |
| 2007/0198935 A1 * | 8/2007 | Constantine et al. ..... | 715/744 |

OTHER PUBLICATIONS

"European Application Serial No. 09007095.4, Office Action mailed Sep. 14, 2010", 6 pgs.

Carr, L, "Experimenting with Hytime Architectural Forms for Hypertest Interchange", Information Services and Use, Elsevier Science Publishers vol. 13, No. 2, XP0005616381, (Apr. 22, 1993), 111-119.

Newcomb, S R, et al., "The Hytime, Hypermedia/Time-Based Document Structuring Language", Communications of the Association for Computing Machinery, ACM vol. 34, No. 11, XP0002715791, (Nov. 1, 1991), 67-83.

(Continued)

*Primary Examiner* — Laurie Ries
*Assistant Examiner* — Tionna Burke
(74) *Attorney, Agent, or Firm* — Schwegman Lundberg & Woessner, P.A.

(57) ABSTRACT

In some example embodiments, a computerized method includes receiving multiple documents from at least one machine-readable media. The multiple documents have a hierarchical relationship relative to each other. The multiple documents include a first document, wherein a second document of the multiple documents comprises an enhancement to first document. The enhancement is at least one of a replacement of part of the first document or an addition to the first document. The computerized method includes displaying the multiple documents on a display screen such that the multiple documents are arranged according to the hierarchical relationship.

18 Claims, 9 Drawing Sheets

(56) References Cited

OTHER PUBLICATIONS

"European Application Serial No. 09007095.4 Search Report mailed Jan. 7, 2010", 9 pgs.

Fazekas, Z., "Facilitating configurability by separation of concerns in the source code", *Journal of Computing and Information Technology—CIT Univ. Comput. Centre Zagreb Croatia*, (2005), 195-210 pgs.

Hartmann, B., et al., "Design as exploration Creating interface alternatives through parallel authoring and runtime tuning", *Proceedings of the 21st Annual ACM Symposium on User Interface Software and Technology—UIST 2008*, (Oct. 19, 2008), 91-100 pgs.

Chu, C., et al., "Coven: Brewing Better Collaboration through software configuration management", Software Engineering Notes ACM vol. 25, No. 6, (2000), 88-97 pgs.

* cited by examiner

SIMULTANEOUSLY DISPLAYING MULTIPLE RELATED DOCUMENTS IN A LOGICALLY HIERARCHICAL MANNER

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2008, SAP AG. All Rights Reserved.

BACKGROUND

Viewing (for reviewing, editing, etc.) of more than one document is some times needed, especially when such documents are related. For example, software code developers can write software code for different parts of a system. These parts of the software code may be related. For example, one part of the software code may be embedded in a different part of the software code.

Example software being developed includes business application programs. Business application programs are generally written and compiled according to a business application programming language such as the Advanced Business Application Programming (ABAP) developed by SAP AG (Walldorf, Germany), Java, C, etc. Some programming languages feature mechanisms to support enhancement of a standard business coding to enable the integration of industry-specific or customer-specific code fragments. This mechanism—known as the Enhancement and Switch Framework—is used to retrofit industry-specific enhancements into the standard coding structure, and to activate or deactivate those enhancements dynamically to achieve industry-specific behavior of the business applications. Enhancements or extensions of the coding structure can be stored separately from the original code structure document.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for displaying of multiple documents are described. In the following description, numerous specific details are set forth. However, it is understood that embodiments of the invention may be practiced without these specific details. In other instances, well-known circuits, structures and techniques have not been shown in detail in order not to obscure the understanding of this description.

Some example embodiments provide for a multi-document editor having a number of sub-editors. Some example embodiments allow the editing of several documents. Each of the documents can have separate states (e.g., active, inactive, saved, not saved, etc.) and separate actions (e.g., save, activate, return to prior version, etc.). Some example embodiments display a logical hierarchy of the document (including enhancements and modifications).

Editing of multiple documents can become confusing, especially if such documents depend on each other. For example, one document can be a replacement of part of another document. In another example, one document can be inserted into another document. Each document can be from a different source (e.g., file). Some example embodiments allow defining of anchor points within a source. At each anchor point, another source can be attached. This source can also have anchor points on which other sources can be attached. The layout of these documents from different sources can be complex and confusing. Therefore, some example embodiments include a type of tree control for these different sources that is part of the edit control. The tree control can display the hierarchical relationships of the documents to allow a viewer of the documents to easily understand the relationships among the documents. In some example embodiments, a separate editor is associated with each source. Further, at each level of the tree, a given editor (including all editors below) can be hidden. Some example embodiments include an editor that can process several sources at approximately a same time. The sources can be at one level or may be nested.

Some example embodiments are operable in the Advanced Business Application Programming (ABAP) switch framework that is usable by software developers (as described above). As a specific example, within the ABAP switch framework, the ABAP enhancements are in the form of switchable code fragments that can be added to existing ABAP code at certain positions in the coding structure. Additionally, these enhancements can be switched on or off by setting separately stored switches. Depending on the switch setting, the corresponding enhancements are pre-processed by the ABAP compiler at compile-time and evaluated at run-time to decide whether or not the enhancement is to be executed. Accordingly, the switch settings serve to configure an application program dynamically.

The switchable code fragments may be written in a variety of programming languages. For proper integration into the switch framework, the code fragments need to be edited together in a standard language environment, which means that a code author needs to have knowledge of the standard code language. Otherwise, the switch framework integrator needs to have knowledge of the code languages of all of the code fragments. Accordingly, some example embodiments may be used to enable software developers to view switchable code segments, which may be from multiple document sources.

Figure 1:
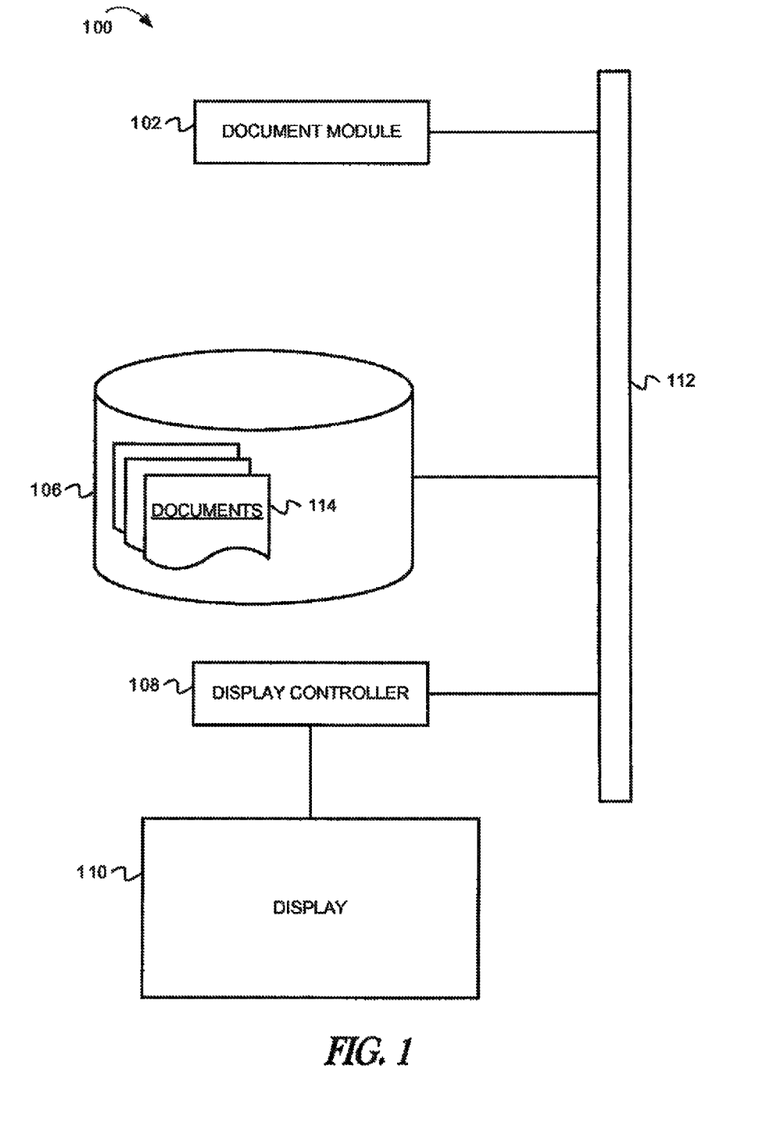
FIG. 1 is a system for displaying of multiple documents, according to some example embodiments.

FIG. 1 is a system for displaying of multiple documents, according to some example embodiments. A system 100 comprises a document module 102, a machine-readable medium 106, a display controller 108, a display 110 and a communication link 112. In some embodiments, the system 100 is representative of a computer, wherein the communication link 112 is a bus that couples together the document module 102, the machine-readable medium 106 and the display controller 108. Alternatively or in addition, components of the system 100 are distributed over a number of computers that are coupled together through a network. For example, the document module 102, the machine-readable medium 106, the display controller 108 and the display 110 are shown as being in a same computer system 100, embodiments are not so limited. The document module 102, the machine-readable medium 106, the display controller 108 and the display 110 may be on separate systems.

In some example embodiments, the machine-readable medium 106 includes tangible volatile and/or non-volatile media (e.g., read only memory (ROM), random access memory (RAM), magnetic disk storage media, optical storage media, flash memory devices, etc.). The machine-readable medium 106 stores documents 114. The documents 114 can be any type of document, spreadsheet, etc. In some example embodiments, the documents 114 store fragments of computer code, application development metadata, etc. For example, a business application can include code that is defined relative to a number of classes (some of which can be related to each other). A first document can store a first class having code that defines different variables, values, etc., methods operable on these different variables, values, etc. A second document can store a second class, function, etc. that is used within the first class.

In some example embodiments, the document module 102 supports multiple documents being displayed in a same user interface. The document module 102 can support one or multiple edit controls across the multiple documents. For example, there can be an edit control for each of the different documents being displayed. The document module 102 accesses and stores documents from and to the machine-readable medium 106. The document module 102 generates and provides information for display in a graphical user interface on the display 110 (using the display controller 108). The graphical user interface can include one or more windows of display information. Examples are provided in figures that are described below. The graphical user interface includes an editor window that is generated by the document module 102. The editor window displays one or more documents in a window of the graphical user interface. The editor window can be a part of the graphical user interface and defined by a graphical frame or other graphically delineating mechanism.

The one or more editor controls can be displayed in separate tab strips at a periphery (e.g., top) of the editor window displaying the document. FIGS. 5-8 are displays of graphical user interfaces, according to some example embodiments (described below). In these graphical user interfaces, the documents are displayed in separate tab strips. However, embodiments are not so limited, as other types of components of a graphical user interface can be used for altering the changes in content for a section. For example, in some example embodiments, a drop down box can be used to change the content (e.g., different documents) for a section. The document module 102 receives and processes user inputs received (e.g, mouse selection, keyboard input, etc.). The document module 102 also stores any modifications to a document back to the machine-readable medium 106. The document module 102 provides a multi-document editor having a number of sub-editors. Each of the documents can have separate states (e.g., active, inactive, saved, not saved, etc.) and separate actions (e.g., save, activate, return to prior version, etc.). In some example embodiments, the document module 102 displays the multiple documents in a logical hierarchy (as further described below).

In some example embodiments, the document module 102 and the display controller 108 are applications or parts of an application used to display multiple documents for viewing, editing, etc. The document module 102, the editor module 104 and the display controller 108 can be software, hardware, firmware or a combination thereof for executing the various operations described herein, according to some example embodiments.

Figure 2:
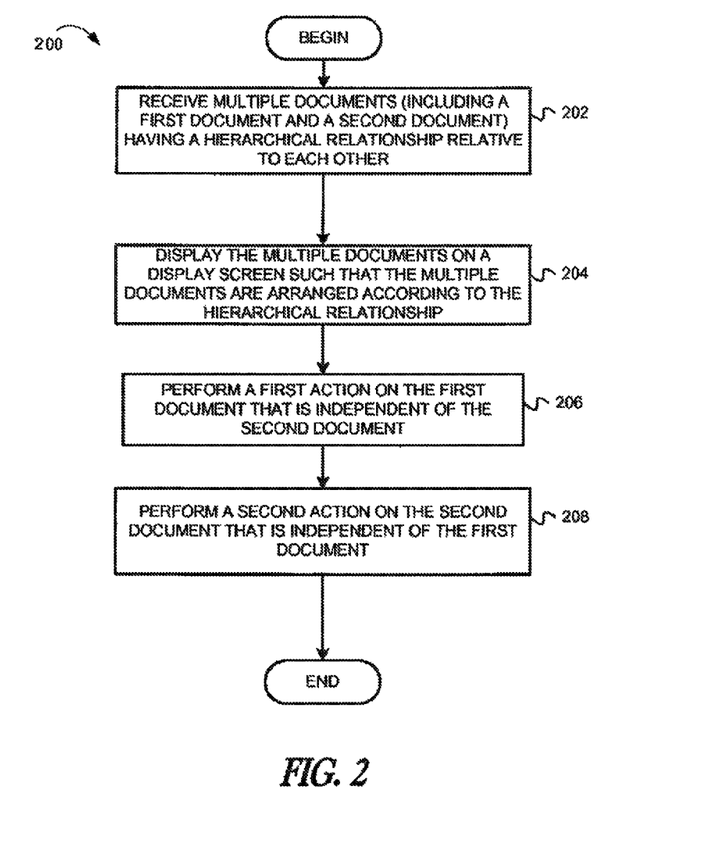
FIG. 2 is a diagram of a method for displaying of multiple documents, according to some example embodiments.
Figure 3:
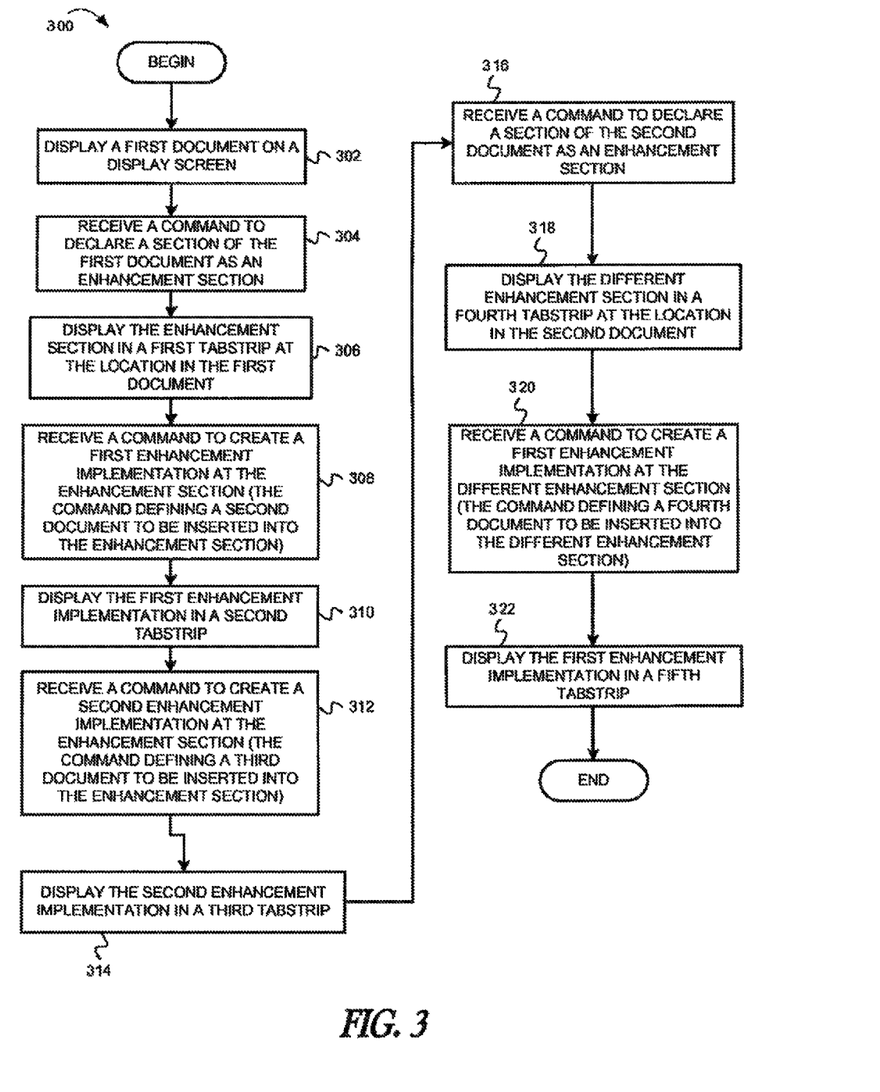
FIG. 3 is a diagram of a method for processing commands for displaying of multiple documents that include enhancement sections, according to some example embodiments.
Figure 4:
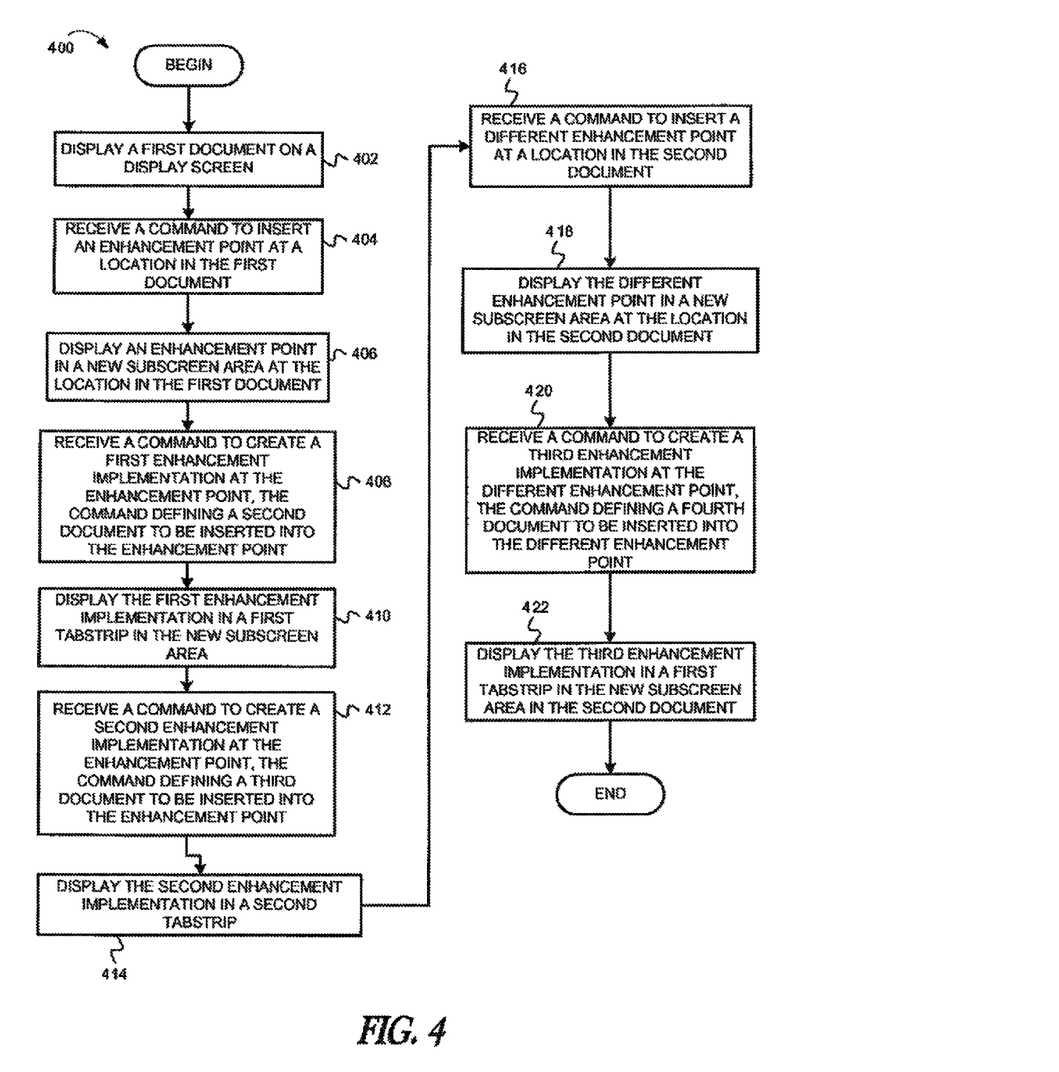
FIG. 4 is a diagram of a method for processing commands for displaying and displaying of multiple documents that include enhancement points, according to some example embodiments.

Operations, according to some example embodiments, are now described. In certain embodiments, the operations are performed when instructions residing on machine-readable media (e.g., software) are executed, while in other embodiments, the methods are performed by hardware or other logic (e.g., digital logic). FIGS. 2-4 are diagrams of different methods for displaying multiple documents, according to some example embodiments. FIGS. 5-8 are displays of different graphical user interfaces having multiple documents, according to example embodiments. The description of the diagrams of FIGS. 2-4 includes references to the displays of FIGS. 5-8. Accordingly, the descriptions of FIGS. 5-8 are incorporated into the description of the diagrams of FIGS. 2-4.

FIG. 2 is a diagram of a method for displaying of multiple documents, according to some example embodiments. A method 200 is described with reference to FIG. 1. In some example embodiments, the method 200 is performed by the document module 102. The method 200 commences at block 202.

At block 202, the document module 102 receives multiple documents 114 (including a first document and a second document) having a hierarchical relationship relative to each other. The first document can be the parent of the second document. For example, the second document can be a part of the first document. As an example of code fragments, the second document can include a function, class, etc. that is within a class that is included in the first document. As further described below, in some example embodiments, the first document includes an enhancement point where the second document is to be inserted. Alternatively, in some example embodiments, the second document includes an enhancement section, which is defined as a data contained in the second document that is intended to replace a section of the first document. In some example embodiments, a user defines an anchor point in a first document. In some example embodiments, the anchor point defines a location in the document where the alternatives or the additions to the document are included. The anchor point can include the identification of this document and the location therein. Further, the anchor point can include identification of the second document that is to be used in the alternative or added to the first document. Accordingly, using the anchor point, the editor is able to locate the location in the first document and the identification of the second document. The second document can be positioned at the defined anchor point in the first document. In some example embodiments, the first document is a sibling of the second document. Accordingly, the first document and the second document can be alternatives to what is to be inserted into a different document. The document module 102 includes tree control operations for displaying the hierarchical relationship of the different documents. For example, a second document that is a child of a first document is positioned within and indented relative to the first document.

Figure 5:
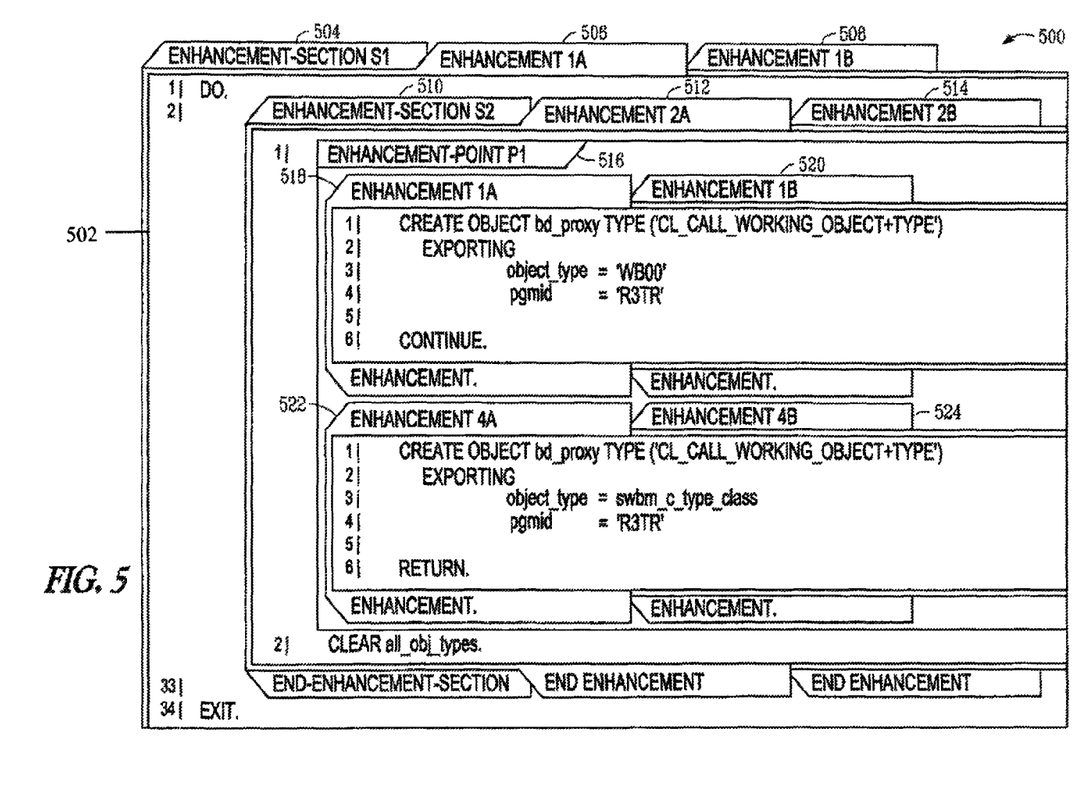
FIG. 5 is a display of a graphical user interface having multiple documents showing nested enhancements, according to some example embodiments.

To help illustrate, FIG. 5 is a display of a graphical user interface having multiple documents showing nested enhancements, according to some example embodiments. FIG. 5 includes a graphical user interface 500 that includes an enhancement section 504 of a first document 502. As described above, an enhancement section includes a section of a document that is to be replaced with one to a number of different sections. A different section can come from a different document (a second document, a third document, etc.). In this example, the different enhancement sections are within tab strips. The current section of the first document 502 (the enhancement section 504) is within a first tab strip 504. A first enhancement implementation is within a second tab strip 506. A second enhancement implementation is within a third tab strip 508. In some example embodiments, only one of the enhancement sections is displayed on the graphical user interface. The user may select a different tab strip to display a different enhancement section. Accordingly, the user can easily view the different enhancement sections. In the graphical user interface 500, the second tab strip 506 is active (thereby showing the contents therein). In this example, the contents of the second enhancement implementation within the second tab strip 506 include a number of other enhancement sections nested therein. Accordingly, the graphical user interface 500 enables the viewing of any number of enhancement sections.

In particular, the second tab strip 506 includes another section of enhancement sections within another set of tab strips. As shown, this section of enhancement sections is shown as being nested in the second tab strip 506 because this section is below and indented relative to the content of the first document 502. The current section for the content in the second tab strip 506 includes another document (an enhancement section 510). A first enhancement implementation is within a second tab strip 512. A second enhancement implementation is within a third tab strip 514.

In the graphical user interface 500, the second tab strip 512 is active (thereby showing the contents therein). In this example, the contents of the second enhancement implementation within the second tab strip 506 include an enhancement point 516. As described above, an enhancement point is a point in the document (e.g., computer code) where an enhancement implementation can be inserted. In this example, the enhancement point 516 includes two different sets of enhancements. A first set of enhancements for the enhancement point 516 includes a selection of a first enhancement in a first tab strip 518 or a second enhancement in a second tab strip 520. In the graphical user interface 500, the first tab strip 518 is active (thereby showing the contents therein). The user may view the contents of the two different enhancements by selection of the two different tab strips. The second set of enhancements for the enhancement point 516 includes a selection of a first enhancement in a first tab strip 522 or a second enhancement in a second tab strip 524. In the graphical user interface 500, the first tab strip 522 is active (thereby showing the contents therein). The user may view the contents of the two different enhancements by selection of the two different tab strips. In the graphical user interface 500, the first tab strip 518 is active Accordingly as shown, the graphical user interface 500 is configured such that the hierarchical relationship of these different enhancement sections is shown to the user. In this example, an enhancement that is nested in another enhancement is within and indented relative to the enhancement it is embedded within. Thus, the user can easily understand the relationship among the different enhancement sections. The enhancements can be in a parent-child relationship (e.g., the enhancement in the tab strip 506 is a parent to the enhancements in the tab strips 512 and 514). The enhancements can also be in a sibling relationship (e.g., the enhancement in the tab strip 506 is a sibling of the enhancement in the tab strip 508). Returning to the method 200 of FIG. 2, the method 200 continues at block 204.

At block 204, the document module 102 displays the multiple documents on a display screen (e.g., the display 110) such that the multiple documents are arranged according to the hierarchical relationship. With reference to the graphical user interface 500 of FIG. 5, the document module 102 displays a first document 502. Other documents are hierarchically displayed in the different enhancement sections that are within the first document 502 (as described above). The method 200 continues at block 206.

At block 206, the document module 102 performs a first action on the first document that is independent of the second document. Examples of a first action includes a save operation, an activate operation, return to prior version operation, etc. Also, each of the documents can have separate states that are independent of each other. Examples of states of a document include active, inactive, saved, not saved, etc. In some example embodiments, the graphical user interface includes identification of the states of the different documents.

Figure 6:
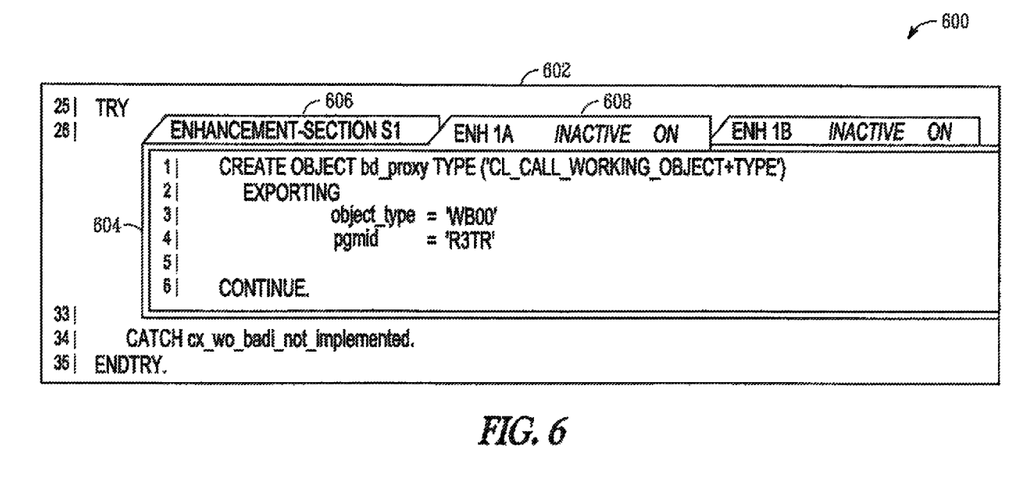
FIG. 6 is a display of a graphical user interface having multiple documents that includes separate states for the multiple documents, according to some example embodiments.

To illustrate, FIG. 6 is a display of a graphical user interface having multiple documents that includes separate states for the multiple documents, according to some example embodiments. FIG. 6 includes a graphical user interface 600 that includes a first document 602. The current section of the first document 602 is within a first tab strip 606. A first enhancement implementation is within a second tab strip 608, which includes a second document 604. As shown, the second tab strip 608 includes an identification of the state of the second document 604 (inactive). This identification of the states can be included in each of the different tab strips. Also, these states can be identified in other locations of the graphical user interface. Such identification enables the user to more easily track the different states of the different documents.

The document module 102 can enable a number of sub-editors, wherein each sub-editor is associated with a document being displayed. Returning to the graphical user interface of FIG. 5, separate actions can be performed on the first document 502 relative to the other documents in the other tab strips in the graphical user interface. Returning to FIG. 2, the method 200 continues at block 208.

At block 208, the document module 102 performs a second action on the second document that is independent of the first document. Examples of a second action includes a save operation, an activate operation, return to prior version operation, etc. As described above, each of the documents can have separate states that are independent of each other. The method 200 is complete. While described with reference to two different documents having independent actions relative to each other, example embodiments are applicable to any number of documents. For example with reference to FIG. 5, each of the different tab strips can have different documents having independent actions relative to each other.

Operations for creating a display having multiple documents that include or are associated with enhancement sections are now described. In particular, FIG. 3 is a diagram of a method for processing commands for displaying of multiple documents that include enhancement sections, according to some example embodiments. A method 300 is described with reference to FIG. 1. In some example embodiments, the method 300 is performed by the document module 102. The method 300 commences at block 302.

At block 302, the document module 102 displays a first document on a display screen (e.g., the display 110). For example, a user may select the first document to be open for display. This input from the user causes the document module 102 to display the first document on the display 110 using the display controller 108. With reference to FIG. 5, the document 502 is displayed on the graphical user interface 500. The method 300 continues at block 304.

At block 304, the document module 102 receives a command to declare a first section of the first document as an enhancement section. A user can input the command to declare the section as an enhancement section at an anchor point in the first document. For example, the user can highlight a section of the document to be declared as an enhancement section. With reference to FIG. 6, the section starting at line 26 of the first document 602 had been selected. The method 300 continues at block 306.

At block 306, the document module 102 displays the enhancement section in a first tab strip at the location in the first document. With reference to FIG. 5, the document module 102 creates a tab strip 504 that is to display the enhancement section for the first document 502. The method 300 continues at block 308.

At block 308, the document module 102 receives a command to create a first enhancement implementation at the enhancement section. In some example embodiments, this command also defines a second document to be inserted into the enhancement section. With reference to FIG. 5, the second document can include the text within the tab strip 506. In particular, the second document can include the text shown in line numbers 1-34 within the tab strip 506. Also, as shown, there are also sections of the second document that are declared enhancement sections (as further described below). Accordingly, example embodiments display the hierarchical relationship among the different enhancement sections (e.g., nesting of enhancement sections within enhancement sections). The method 300 continues at block 310.

At block 310, the document module 102 displays the first enhancement implementation in a second tab strip at the location in the first document. With reference to FIG. 5, the document module 102 creates the tab strip 506 that is to display this first enhancement implementation (as described above). The method 300 continues at block 312.

At block 312, the document module 102 receives a command to create a second enhancement implementation at the enhancement section. In some example embodiments, this command also defines a third document to be inserted into the enhancement section. With reference to FIG. 5, the third document can include the text within the tab strip 508. Similar to the first enhancement implementation, there can be sections of the third document that can be declared enhancement sections (as further described below). The method 300 continues at block 314.

At block 314, the document module 102 displays the second enhancement implementation in a third tab strip at the location in the first document. With reference to FIG. 5, the document module 102 creates the tab strip 508 that is to display this second enhancement implementation (as described above). The method 300 continues at block 316.

At block 316, the document module 102 receives a command to declare a section of the second document as an enhancement section. A user can input the command to declare the section as an enhancement section at an anchor point in the second document. For example, the user can highlight a section of the document to be declared as an enhancement section. With reference to FIG. 5, the section starting at line 1 of the second document in the tab strip 506 had been selected. The method 300 continues at block 318.

At block 318, the document module 102 displays the enhancement section in a fourth tab strip at the location in the second document. With reference to FIG. 5, the document module 102 creates a tab strip 510 that is to display the enhancement section for the second document. The method 300 continues at block 320.

At block 320, the document module 102 receives a command to create a first enhancement implementation at the enhancement section. In some example embodiments, this command also defines a fourth document to be inserted into the enhancement section. With reference to FIG. 5, the fourth document can include the text within the tab strip 512. The method 300 continues at block 322.

Figure 7:
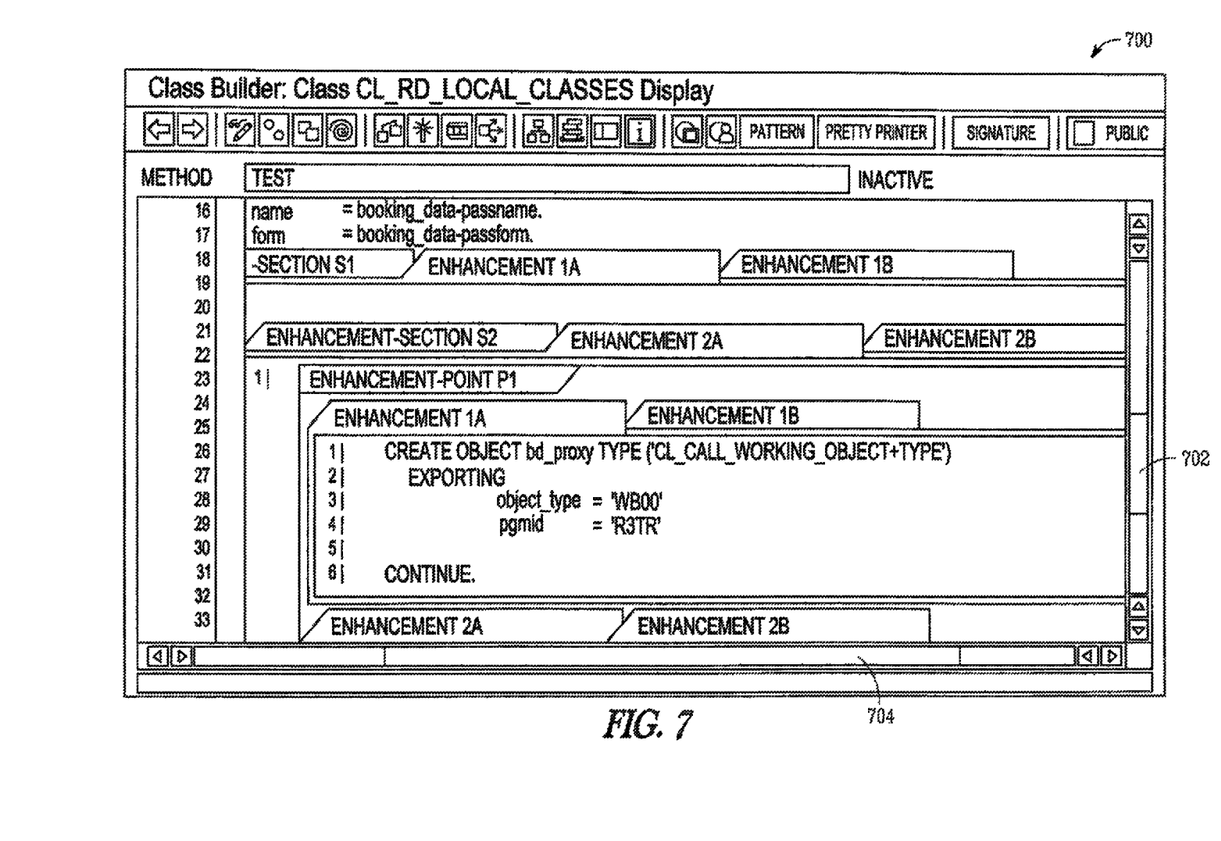
FIG. 7 is a display of a graphical user interface having multiple documents showing nested enhancements and sliders for viewing, according to some example embodiments.

At block 322, the document module 102 displays the first enhancement implementation in a fifth tab strip at the location in the second document. With reference to FIG. 5, the document module 102 creates the tab strip 512 that is to display this first enhancement implementation (as described above). The method 300 may continue as additional enhancement implementations for different enhancement sections, additional enhancement sections, etc. can be created (as described above). In some example embodiments, the graphical user interface includes sliders (vertical and horizontal) to enable the viewing of any number of enhancements. In particular, FIG. 7 is a display of a graphical user interface having multiple documents showing nested enhancements and sliders for viewing, according to some example embodiments. FIG. 7 includes a graphical user interface 700 that includes a number of enhancement sections and enhancement points that are nested (similar to the graphical user interface 500 of FIG. 5). The graphical user interface 700 also includes a vertical slider 702 and a horizontal slider 704 to allow the user to adjust the graphical user interface 700 to view the different enhancements. Such sliders can be particularly useful if there are a number of nested enhancements (as shown). Returning to FIG. 3, the method 300 is complete.

Operations for creating a display having multiple documents that include or are associated with enhancement points are now described. In particular, FIG. 4 is a diagram of a method for processing commands for displaying and displaying of multiple documents that include enhancement points, according to some example embodiments. A method 400 is described with reference to FIG. 1. In some example embodiments, the method 400 is performed by the document module 102. The method 400 commences at block 402.

At block 402, the document module 102 displays a first document on a display screen (e.g., the display 110). For example, a user may select the first document to be open for display. This input from the user causes the document module 102 to display the first document on the display 110 using the display controller 108.

Figure 8:
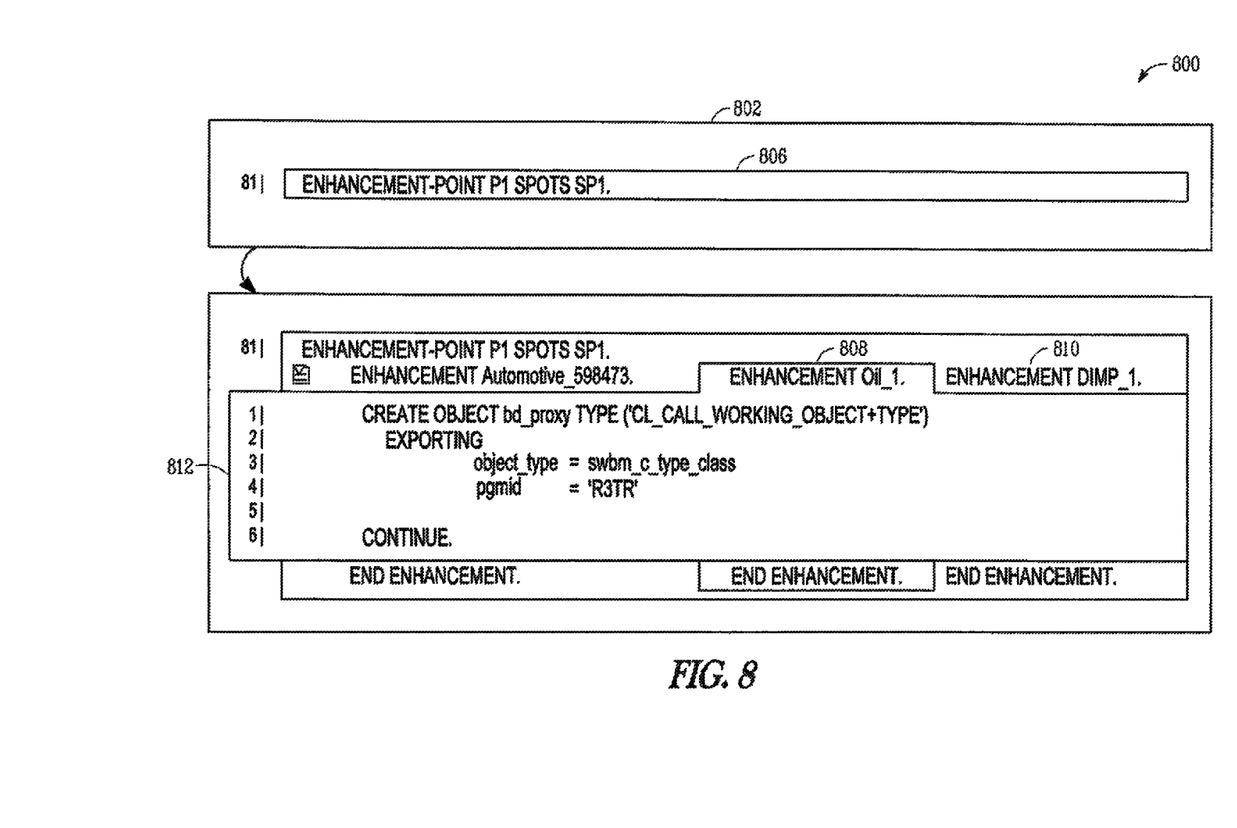
FIG. 8 is a display of a graphical user interface having multiple documents showing the inclusion of enhancement points, according to some example embodiments.

To help illustrate, FIG. 8 is a display of a graphical user interface having multiple documents showing the inclusion of enhancement points, according to some example embodiments. FIG. 8 includes a graphical user interface 800 that includes a first document 802. The first document 802 includes an enhancement point 806. A user editing the first document 802 can insert the enhancement point 806. A first enhancement implementation is within a first tab strip 808 for the enhancement point 806. The first enhancement implementation includes a second document 812. The graphical user interface 800 also includes a second enhancement implementation that is within a second tab strip 810. The contents of the second enhancement implementation are not viewable on the graphical user interface 800 shown in FIG. 8. However, the user can select between the two different enhancement implementations by selection of the tab strips. Returning to FIG. 4, the method 400 continues at block 404.

At block 404, the document module 102 receives a command to insert an enhancement point at a location in the first document. A user can input the command to insert the enhancement point at an anchor point in the first document. With reference to FIG. 8, the enhancement point 806 is at line 81 of the first document 802. The method 400 continues at block 406.

At block 406, the display module 102 displays the enhancement point in a new subscreen area at the location in the first document. With reference to FIG. 8, the new subscreen area is positioned at line 81 of the first document 802. The method 400 continues at block 408.

At block 408, the display module 102 receives a command to create a first enhancement implementation at the enhancement point. In some example embodiments, this command also defines a second document to be inserted into the enhancement point. For example, a user may input a command to create the first enhancement implementation. The command from the user can input the document to be included in the first enhancement implementation. The method 400 continues at block 410.

At block 410, the display module 102 displays the first enhancement implementation in a first tab strip in the new subscreen area. With reference to FIG. 8, the first enhancement implementation is within the first tab strip 806 that includes the second document (not shown). The method 400 continues at block 412.

At block 412, the display module 102 receives a command to create a second enhancement implementation at the enhancement point. In some example embodiments, this command also defines a third document to be inserted into the enhancement point. For example, a user may input a command to create the second enhancement implementation. The command from the user can input the document to be included in the second enhancement implementation. The method 400 continues at block 414.

At block 414, the display module 102 displays the second enhancement implementation in a second tab strip in the new subscreen area. With reference to FIG. 8, the second enhancement implementation is within the second tab strip 808. The method 400 continues at block 416.

At block 416, the document module 102 receives a command to insert a different enhancement point at a location in the second document. A user can input the command to insert the enhancement point at an anchor point in the second document. With reference to FIG. 8, the different enhancement point (not shown) can be inserted at a location in the second document 812. With reference to FIG. 5, the enhancement points can be nested similar to the enhancement sections. Also, as shown in FIG. 5, enhancement points can be intermixed with the enhancement sections in any combination. The method 400 continues at block 418.

At block 418, the display module 102 displays the different enhancement point in a new subscreen area at the location in the second document. With reference to FIG. 8, the new subscreen area (not shown) can be inserted at the designated location in the second document 812 (similar to the new subscreen area created for the enhancement point in the first document 802). The method 400 continues at block 420.

At block 420, the display module 102 receives a command to create a third enhancement implementation at the different enhancement point. In some example embodiments, this command also defines a fourth document to be inserted into the different enhancement point. For example, a user may input a command to create the third enhancement implementation. The command from the user can input the document to be included in the third enhancement implementation. The method 400 continues at block 422.

At block 422, the display module 102 displays the third enhancement implementation in a first tab strip in the new subscreen area of the second document. With reference to FIG. 8, the third enhancement implementation (not shown) can be inserted in the subscreen area for the different enhancement point in the second document 812 (similar to the first enhancement implementation created for the enhancement point in the first document 802). The method 400 may continue as additional enhancement implementations for different enhancement points, additional enhancement points, etc. can be created (as described above). In some example embodiments, the graphical user interface includes sliders (vertical and horizontal) to enable the viewing of any number of enhancements for the different enhancement points (as described with reference to FIG. 7). Returning to FIG. 4, the method 400 is complete.

Figure 9:
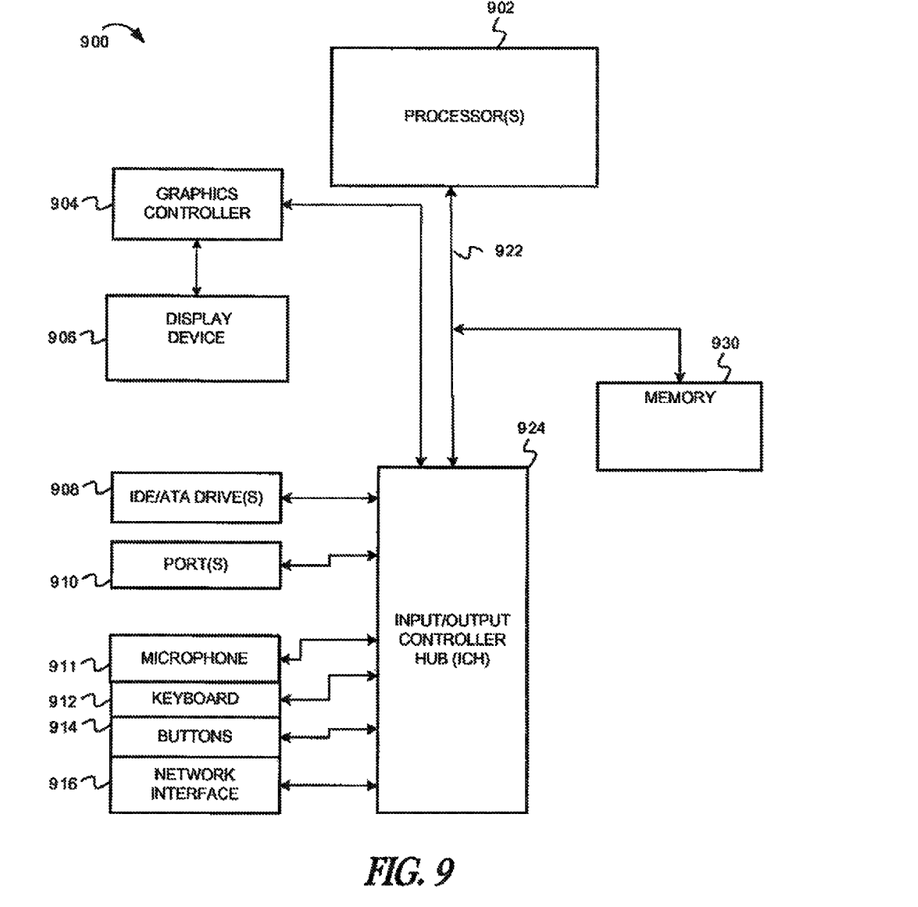
FIG. 9 is a computer device that executes software for performing operations related to performing multi-document viewing, according to some example embodiments.

An embodiment wherein software performs operations related to performing multi-document viewing as described herein is now described. In particular, FIG. 9 is a computer device that executes software for performing operations related to performing multi-document viewing, according to some example embodiments. FIG. 9 illustrates a computer device 900 that may be representative of at least part of the system 100.

As illustrated in FIG. 9, a computer device 900 comprises processor(s) 902. The computer device 900 also includes a memory 930, a processor bus 922, and an input/output controller hub (ICH) 924. The processor(s) 902, the memory 930, and the ICH 942 are coupled to the processor bus 922. The processor(s) 902 may comprise any suitable processor architecture. The computer device 900 may comprise one, two, three, or more processors, any of which may execute a set of instructions in accordance with some embodiments of the invention.

The memory 930 stores data and/or instructions, and may comprise any suitable memory, such as a random access memory (RAM). For example, the memory 930 may be a Static RAM (SRAM), a Synchronous Dynamic RAM (SDRAM), DRAM, a double data rate (DDR) Synchronous Dynamic RAM (SDRAM), etc. A graphics controller 904 controls the display of information on a display device 906, according to an embodiment of the invention.

The ICH 924 provides an interface to Input/Output (I/O) devices or peripheral components for the computer device 900. The ICH 924 may comprise any suitable interface controller to provide for any suitable communication link to the processor(s) 902, the memory 930 and/or to any suitable device or component in communication with the ICH 924.

For an embodiment of the invention, the ICH 924 provides suitable arbitration and buffering for each interface.

In an embodiment, the ICH 924 provides an interface to one or more suitable Integrated Drive Electronics (IDE)/Advanced Technology Attachment (ATA) drive(s) 908, such as a hard disk drive (HDD). In an embodiment, the ICH 924 also provides an interface to a keyboard 912, a mouse 914, one or more suitable devices through ports 916-918 (such as parallel ports, serial ports, Universal Serial Bus (USB), Firewire ports, etc.). In some embodiments, the ICH 924 also provides a network interface 920 though which the computer device 900 may communicate with other computers and/or devices.

With reference to the system 100, the memory 930 and/or one of the IDE/ATA drives 908 can store the documents 114. In some example embodiments, the document module 102 is a set of instructions executing within the processor(s) 902. Therefore, the document module 102 can be stored in a machine-readable medium that are a set of instructions (e.g., software) embodying any one, or all, of the methodologies described herein. For example, the document module 102 can reside, completely or at least partially, within the memory 930, the processor(s) 902, one of the IDE/ATA drive(s) 908, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for performing multi-document viewing, in accordance with some example embodiments. Flow diagrams illustrate the operations for performing multi-document viewing, in accordance with some example embodiments. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:
   receiving multiple documents from at least one machine-readable media, the multiple documents having a hierarchical relationship relative to each other, the multiple documents including a first document and a second document, the hierarchical relationship between the first document and the second document being such that the second document is the child of the first document in the hierarchy and is associated with a specific subsection of the first document and the second document includes a replacement or addition for the specific subsection of the first document and an entirety of the second document is included in the first document as an enhancement to the first document; and
   simultaneously displaying the multiple documents on a display screen such that the multiple documents are distinct and are arranged according to the hierarchical relationship, wherein the position at which the second document is displayed is entirely within the first document and that the position of the second document within the first document is based on the specific subsection of the first document that the second document is associated with.

2. The computerized method of claim 1, wherein each of the multiple documents has a separate state, the separate state comprising at least one of active, inactive, saved and unsaved.

3. The computerized method of claim 1, further comprising:
   performing a first action on the first document that is independent of the second document;
   performing a second action on the second document that is independent of the first document, wherein each of the first action and the second action comprises at least one of a save operation, an activate operation and a return to prior version operation.

4. The computerized method of claim 1, wherein each of the multiple documents is from a different source.

5. The computerized method of claim 1, wherein a third document of the multiple documents is a different enhancement to the second document, wherein the different enhancement is at least one of a replacement of part of the second document or an addition to the second document.

6. The computerized method of claim 5, wherein the displaying of the multiple documents comprises displaying the second document and the third document in individual sub-screen areas at a location inside the first document based on the specific subsections of the first document with which the second document and the third document are associated, wherein the individual sub-screen areas are at least one of separate tab strips or as part of a selection from a drop down box.

7. The computerized method of claim 6, wherein the location of the enhancement in the first document is defined as an enhancement section, wherein the displaying of the multiple documents comprises displaying the enhancement section in an individual sub-screen area, wherein the individual sub-screen area is at least one of a separate tab strip or as part of a section from a drop down box.

8. The computerized method of claim 7, wherein the separate tab strips are collapsible such that text of the document for a tab strip is not displayed in response to collapsing of the tab strip.

9. The computerized method of claim 5, wherein the displaying comprises displaying the multiple documents with numbered lines, wherein numbering of the numbered lines for a document of the multiple documents is independent of numbering of the numbered lines for other documents of the multiple documents.

10. The computerized method of claim 1, wherein a third document of the multiple documents is an enhancement to the second document, wherein the displaying comprises displaying the third document below and indented relative to the second document, wherein the enhancement to the second document is at least one of a replacement of part of the second document or an addition to the second document.

11. A non-transitory machine-readable medium that provides instructions which, when executed by a machine, cause said machine to perform operations including:
   displaying a first document on a display screen;
   receiving a command to insert an enhancement point at an anchor point in the first document;
   displaying the enhancement point at the anchor point in the first document;
   receiving a command to create a first enhancement implementation at the enhancement point, the command to create the first enhancement implementation defining a second document to be inserted in its entirety into the first enhancement implementation and establishing a first hierarchical relationship between the first document and the second document;
   displaying the first enhancement implementation of the first document entirely within the first document at a location based on the location of the anchor point in the first document, while continuing to display the first document;
   receiving a command to create a second enhancement implementation at the anchor point, the command to create the second enhancement implementation defining a third document to be inserted in its entirety into the second enhancement implementation and establishing a second hierarchical relationship between the first document and the third document;
   displaying the second enhancement implementation of the first document, while continuing to display the first document and the first enhancement implementation, wherein the second document or the third document is displayed at the anchor point depending on whether the second document or the third document, respectively, is selected to be active;
   performing a first action on the first document that is independent of the second document; and
   performing a second action on the second document that is independent of the first document, wherein each of the first action and the second action comprises at least one of a save operation, an activate operation and return to prior version operation, wherein each of the first document, the second document and the third document has a separate state, the separate state comprising at least one of active, inactive, saved and unsaved.

12. The machine-readable medium of claim 11, wherein the operations comprise:
   receiving a command to insert a different enhancement point a a different anchor point in the second document;
   displaying the different enhancement point at the different anchor point in the second document;
   receiving a command to create a third enhancement implementation at the different enhancement point, the command defining a fourth document to be inserted into the third enhancement implementation; and
   displaying the third enhancement implementation, wherein the third enhancement implementation is indented and below the first document and the second document.

13. An apparatus comprising:
   one or more processors;
   memory; and
   one or more programs stored in the memory, the one or more programs comprising instructions for:
   receiving a first document, a second document and a third document from at least one machine-readable media, the second document being associated with a specific subsection of the first document and is at least one of a replacement of a contiguous part of the first document or an addition to the first document at the specific subsection in the first document, the third document being associated with a specific subsection of the second document and is at least one of a replacement of a contiguous part of the second document or an addition to the second document the specific subsection in the second document; and
   simultaneously and distinctly displaying, on a display, the first document, the second document and the third document in a nested enhancement hierarchy by displaying the entirety of the second document in the first document at a location based on the specific subsection of the first document with which it is associated and an entirety of the third document is included in the second document at a location based on the specific subsection of the second document with which it is associated; and indicating at least one of the a location in the first document at which the second document is included, and the location in the second document at which the third document is included.

14. The apparatus of claim 13, wherein content of the second document is indented relative to content of the first document.

15. The apparatus of claim 14, further comprising displaying the third document in a sub-screen area of the second document, wherein content of the third document is indented relative to content of the second document.

16. The apparatus of claim 13, further comprising receiving edit commands to edit the first document, the second document and the third document, wherein each of the first document, the second document and the third document has a separate state relative to each other, wherein the separate state comprises at least one of active, inactive, saved and unsaved.

17. The apparatus of claim 16, further comprising performing separate actions on the first document, the second document and the third document, wherein the separate actions comprises at least one of a save operation, an activate operation and return to prior version operation.

18. The apparatus of claim 13, further comprising displaying the first document, the second document and the third document with numbered lines, wherein numbering of the first document, numbering of the second document and numbering of the third document are independent of each other.

* * * * *